United States Patent [19]

Yen et al.

[11] Patent Number: 4,550,064
[45] Date of Patent: Oct. 29, 1985

[54] HIGH CYCLE LIFE SECONDARY LITHIUM BATTERY

[75] Inventors: Shiao-Ping S. Yen, Altadena; Boyd J. Carter, S. San Gabriel; David H. Shen, Rosemead; Robert B. Somoano, LaCanada, all of Calif.

[73] Assignee: California Institute of Technology, Pasadena, Calif.

[21] Appl. No.: 559,345

[22] Filed: Dec. 8, 1983

[51] Int. Cl.[4] ............................................. H01M 4/00
[52] U.S. Cl. .................................... 429/94; 429/194; 429/250; 429/254; 427/243
[58] Field of Search .................. 429/194, 94, 250, 249, 429/248, 254; 427/243

[56] References Cited

U.S. PATENT DOCUMENTS

| | | | |
|---|---|---|---|
| 3,472,700 | 10/1969 | Kollman et al. | 429/250 |
| 3,798,197 | 3/1974 | Naschivitz et al. | 429/250 X |
| 4,217,404 | 8/1980 | Verzwyvelt | 429/250 X |
| 4,252,878 | 2/1981 | Lazarz et al. | 429/250 |
| 4,299,892 | 11/1981 | Dines et al. | 429/194 |
| 4,322,317 | 3/1982 | Rao et al. | 429/194 X |
| 4,396,687 | 8/1983 | Kummer | 429/19 |
| 4,438,185 | 3/1984 | Toskier | 429/250 |

OTHER PUBLICATIONS

S. P. S. Yen, D. H. Shen, R. B. Somoano, "Elastomeric Binders for Electrodes," *J. Electrochem Soc.:* Electrochemical Science and Technology, May 1983, pp. 1107–1109.

*Primary Examiner*—Charles F. LeFevour
*Attorney, Agent, or Firm*—Marvin E. Jacobs

[57] ABSTRACT

A secondary battery (10) of high energy density and long cycle is achieved by coating the separator (18) with a film (21) of cationic polymer such as polyvinylimidazoline. The binder of the positive electrode (14) such as an ethylene-propylene elastomer binder (26) containing particles (28) of TiS$_2$ chalcogenide can also be modified to contain sulfone functional groups by incorporating liquid or solid sulfone materials such as 0.1 to 5 percent by weight of sulfolane into the binder. The negative lithium electrode (14), separator (18) and positive electrode (16) are preferably spirally wound and disposed within a sealed casing (17) containing terminals (32, 34). The modified separator and positive electrode are more wettable by the electrolytes in which a salt is dissolved in a polar solvent such as sulfolane.

15 Claims, 6 Drawing Figures

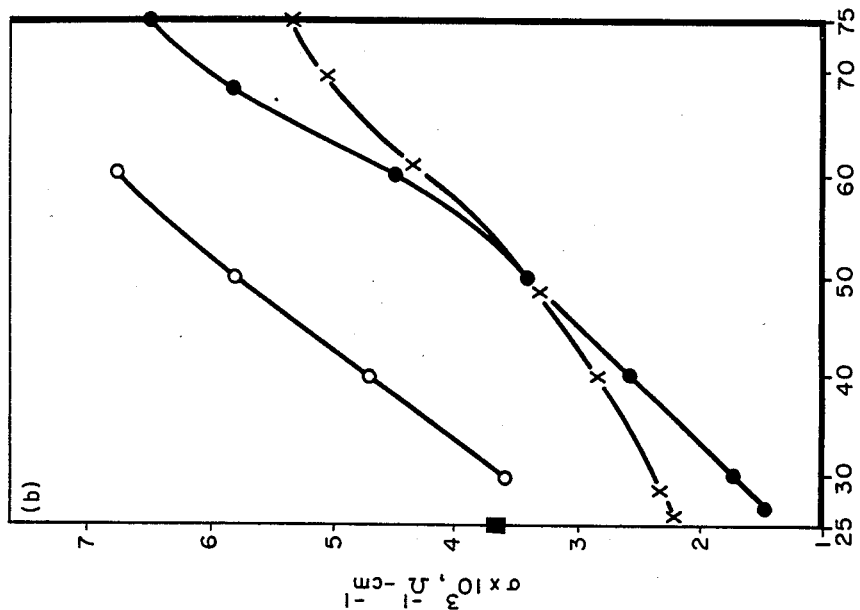
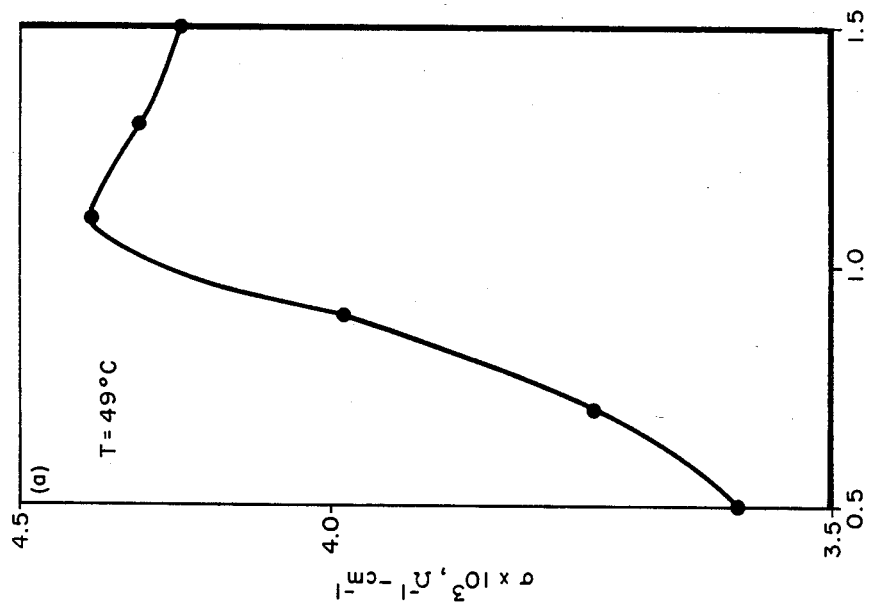
Fig. 5.
Fig. 4.

HIGH CYCLE LIFE SECONDARY LITHIUM BATTERY

ORIGIN OF THE INVENTION

The invention described herein was made in the performance of work under a NASA contract and is subject to the provisions of Section 305 of the National Aeronautics and Space Act of 1958, Public Law 83-568 (72 Stat 435; USC 2457).

TECHNICAL FIELD

This invention relates to electrical storage batteries and, more particularly, to a lithium-chalcogenide secondary battery.

DESCRIPTION OF THE PRIOR ART

A very promising, light weight, high energy density, rechargeable battery is the alkali metal-transition metal chalcogenide-battery. The layered chalogenide cathode expands to readily accept an alkali metal atom, usually lithium, as an intercalate during discharge. During recharge, the lithium ions are redeposited on the anode in the form of lithium metal. A battery of this structure is disclosed in U.S. Pat. No. 4,009,052. The cathode is prepared by pressing and sintering a mixture of the chalcogenide and particles of Teflon (polytetrafluoroethylene) to form a dispersion of the cathodically active chalcogenide in a continuous phase of binder.

An important problem affecting the performance of ambient temperature, secondary lithium batteries is the poor mechanical integrity of the cathode. Upon repeated charge and discharge of an intercalatable cathode, e.g. $TiS_2$, the small expansion and contraction of the $TiS_2$ lattice gives rise to stresses which disturb the electrode structure and can contribute to capacity loss. Use of an inelastic binder material such as Teflon exacerbates this problem, e.g., leads to electrode disruption and poor $TiS_2$ particle-particle contact. The fabrication process utilizing Teflon is unduly complicated, requiring high temperature and pressure. The resulting electrodes are brittle, nonflexible plates. Furthermore, lithium reacts with halogen, such as fluorine. Therefore, fluorocarbon polymers cannot be used to prepare cathodes in the discharged state which contain lithium intercalated chalcogenides. The use of elastomers such as $TiS_2$ binder materials in place of Teflon (a high Tg material) is disclosed in Serial No. 282,251, filed July 10, 1981. The use of elastomers that are unreactive with lithium results in room-temperature-atmospheric pressure preparation of cathodes which exhibit improved performance.

Another principle problem inhibiting the use of secondary lithium batteries is the limited cycle-life caused by the instability of the commonly used cyclic ether electrolyte solvents such as dioxolane. The non-aqueous electrolytes are degraded in the electrochemical environment of the cell, especially in presence of the highly reactive electrodeposited lithium. In addition, solvents having better stability such as 2-methyl tetrahydrofuran (2Me-THF) have very high vapor pressures and low dielectric constants at room temperature. The high vapor pressures generated by these solvents increase handling and safety problems and limit safe operation of the battery to ambient or low temperature operation. At higher temperatures of the order of 60° C. to 100° C., where thermal management is facilitated, the vapor pressures are too high for reliable use unless a very heavy, secure battery case is provided.

Lithium batteries containing non-aqueous electrolytes are disclosed in U.S. Pat. Nos. 4,104,450, 4,104,451, 4,167,458, 4,049,887, 4,060,674, 4,163,829, 4,148,977, 4,132,837, 4,118,550, 4,117,213, 4,086,403 and 4,071,665.

Battery performance is affected by the poor wetting of the porous, organic separator materials utilized and of the composite cathode by the highly polar, non-aqueous solvents utilized in the electrolyte solution.

DESCRIPTION OF THE INVENTION

A secondary lithium battery having improved cycle-life is provided in accordance with the invention. Thermal management is improved since the battery of the invention can operate at temperatures up to about 100° C., facilitating use in automotive and spacecraft applications. The battery of the invention can be fabricated in a safer manner and handling and packaging are simplified due to the use of a lower vapor pressure electrolyte. Stability of the electrolyte also contributes to high cycle-life. The battery of the invention includes stable, compatible and wettable separators and electrodes.

Studies have indicated that solvent reduction is a dominant degradation mode in the lithium-arsenic hexafluoride/2-methyltetrahydrofuran electrolyte system. Improved electrochemical stability is achieved in the battery of the invention by use of sulfolane-type solvents which have relatively high dielectric constants and low vapor pressures. These polar solvents yield good lithium plating with minimum dendrite formation. Electrolytes containing sulfolane also exhibit improved stripping/plating efficiency because of the excellent reduction stability. An additional benefit is the high oxidation potential of sulfolane which prevents any oxidation during overcharging of the cell.

The use of sulfolane solvents is inhibited by incompatibility of the polar sulfolane liquid with the hydrophobic separator and with the hydrocarbon binder of the cathode. Improved wetting of the separator and the cathode are achieved by coating the separator with a film of cationic polymer and adding sulfone functional groups to the binder. The latter is achieved by adding some sulfolane solvent or utilizing a polysulfone polymer as binder. The impedance of the cell is lowered significantly when the solvent freely wets the coated separator and sulfone modified cathode binder according to the invention.

Cycle life of cells utilizing 2Me-THF/1.5M $LiAsF_6$ solvent based electrolytes is only 100-150 in practical laboratory cells (e.g., about 500 mAhr) before the cell capacity diminishes to a very low value (e.g., less than 30 percent of the initial capacity). However, a 1.3M $LiAsF_6$/sulfolane cell having improved wetting of the separator and cathode according to the invention achieves over 350 cycles before the cell capacity drops to less than 30 percent of theoretical capacity.

These and many other features and attendant advantages of the invention will become apparent as the invention becomes better understood by reference to the following detailed description when considered in conjunction with the accompanying drawings.

BRIEF DESCRIPTION OF THE DRAWINGS

FIG. 4 is a graph showing conductivity of sulfolane as a function of LiAsF$_6$ concentration;

FIG. 5 is a series of curves showing conductivity of 1.1M LiAsF$_6$/sulfolane (x); 1.5M LiAsF$_6$/2-Me-THF(.); 1.3M LiAsF$_6$/3-MeS(.); and, 1.37M LiAsF$_6$ in a 2:1 by volume mixture of 3Me-S and 2Me-THF( . )

DESCRIPTION OF THE PREFERRED EMBODIMENTS

Figure 1:
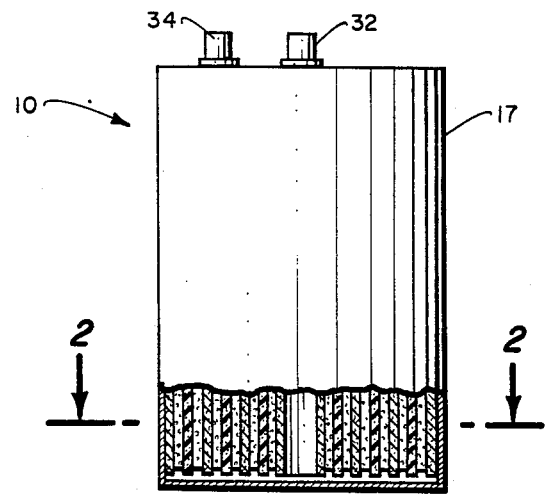
FIG. 1 is a front view in elevation and partial cut away of a spiral-wound, secondary alkaline metal battery.
Figure 2:
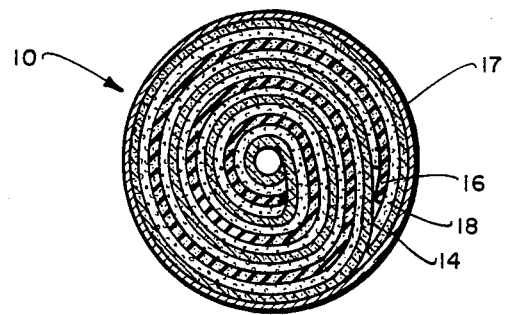
FIG. 2 is a section taken on line 2—2 of FIG. 1.
Figure 3:
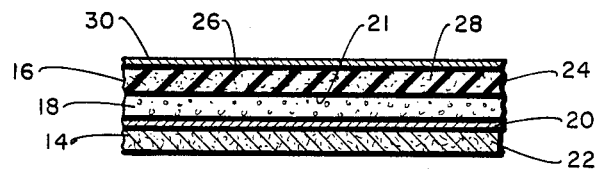
FIG. 3 is an enlarged view in section of the assembly of electrodes and separator sheet.

The preferred cell configuration is illustrated in FIGS. 1 and 2. The spiral-wound battery 10 contains electrodes 14, 16 disposed within a sealed casing 17. The electrodes 14, 16 are separated by sheets 18 of porous material imbibed with electrolyte. The separator sheets can be formed of Celgard (microporous polypropylene) or mats of porous fiberglass. As shown in FIG. 3, the negative electrode 14 usually consists of a layer 20 of lithium or alloys thereof deposited on a high area current collector such as a nickel screen 22. The positive electrode 16 consists of a composite layer 24 of polymeric binder 26 containing a dispersion of chalcogenide particles 28 pressed into a high area current collector such as a sheet 30 of expanded nickel. The positive electrode 14 separator 18, and the negative electrode 16 were spiral wound. The positive electrode 14 is connected to the terminal 32, and the negative electrode 16 is connected to the negative terminal 34.

The negative electrode 16 contains a metal (M) capable of dissolving in the electrolyte and intercalating with the chalogenide in the positive electrode. The metal M can be selected from Group Ia metals, Group IIa metals, Group IIb metals, Group IIIa metals, Group IIIb metals, Group IVa metals, Group IVb metals, Group IVb elements, Group Va metals or mixtures or alloys thereof. The most suitable negative electrode materials are the Group Ia metals (Li, Na, K) or magnesium, calcium or zinc. Lithium is the most desirable material for a high energy density, ambient temperature battery.

The positive electrode 14 is formed by applying a paste of chalcogenide particles in binder onto the conductive substrate and drying and curing the binder. The paste contains 70 percent to 99 percent by weight of the chalcogenide, the remainder being binder. The binder can be a polysulfone stable in the electro-chemical environment of the cell or a hydrocarbon binder containing a dispersion of 0.1 to 5 percent of a sulfolane.

The particles of electroactive material can be selected from a chalogenide of the formula M$_n'$X$_m$ where M' is a metal selected from the group consisting of titanium zirconium, hafnium, niobium, tantalum, and vanadium; X is an element selected from oxygen sulfur, selenium or tellurium and n is a number having a value between 1 and 6, usually about 1.1 and 3.0, preferably between about 1.8 and 2.1 and m has a value between 2 and 3. The particles may also include alloys or mixtures of said compounds such as sulfospinel or CuCOS$_4$, etc. An especially useful chalcogenide material is titanium disulfide having a particle size from 0.1 to 30 microns.

The binder can be a fluorocarbon such as polytetrafluoroethylene or hydrocarbon polymer such as polyethylene or polypropylene. However, longer cycle life is provided by use of elastomers which are capable of yielding as the intercalated chalgogenides expand. The elastomers should be inert to the solvent and stable in the electrochemical environment of the cell. The elastomer has a glass transition temperature, Tg, below −20° C. Preferred elastomers do not contain halogen or unsaturation, both of which are reactive with lithium ions. Preferred materials are ethylene-propylene (EPR) elastomers or ethylene-propylene-diene (EPDM) elastomers having a Mooney Viscosity (212° F.) between 10 and 100, usually from 35 to 75. EPDM polymers containing about 50 to 70 mol percent ethylene, 20 to 40 mol percent propylene and 5 to 20 mol percent norborene are available from several commercial sources. The norborene is available from several commercial sources. The norborene group can be utilized for crosslinking by radiation or by heat. The EPDM copolymer utilized in the experiments has a Tg about 60° C., a molecular weight of 100,000 to 200,000 and contains 63.7 mol percent ethylene, 34.9 mol percent propylene and 1.4 mol percent norbornene groups.

The cathode is fabricated by dissolving the EPDM polymer in common, volatile, inert solvent such as cyclohexane, to form a 1, 2 or 4 weight percent (w/o) solution of suitable viscosity. A small amount of sulfolane or an alkylated derivative thereof, 3-methyl sulfolane or 3,4-dimethyl sulfolane is added and the solution is heated, if necessary, to dissolve the sulfolane. The chalcogenide is then added and the dispersion stirred to form a paste containing 1 to 5 weight percent binder. The paste is then coated onto a screen or other support and dried in vacuo to remove solvent. Slight pressure can be applied to the finished electrode to improve smoothness of the surface, but it is normally not necessary.

The electrolyte comprises a solution of an ionized salt in the sulfolane solvent. The salt, MZ, usually contains the same metal, M, as the negative electrode and an anionic or complexing moiety, Z, such as halide, sulfate, arsenofluoride, beta-alumina, thiocyanate, nitrate, phosphofluoride, perchlorate, fluoroborate, aryl borate, etc. The concentration of salt in the electrolyte can be from 0.5 to 3.0 molar, usually from about 0.8 to 1.5 molar. Especially useful electrolyte salts include LiAsF$_6$, LiCO$_4$, LiBF$_4$, KCNS, LiCNS, lithium tetraphenyl borate, LiCF$_3$SO$_3$, LiPF$_6$ and the like.

The sulfolane solvent contains at least 50 percent by volume of a sulfolane of the formula:

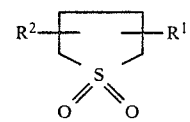

having a boiling point above 270° C., a melting point above −5° C. and a dielectric constant less than 50. R$^1$ and R$^2$ are inert substituents selected from alkyl of 1 to 5 carbon atoms, aryl such as phenyl or alkoxy of 1 to 5 carbon atoms. The properties of representative solvents are provided in the following Table:

TABLE 1

| Solvent | MP °C. | BP °C. | Dielectric Constant, E |
|---|---|---|---|
| Sulfolane | 27 | 285 | 44 |
| 3-methyl sulfolane | 0 | 276 | 29 |

TABLE 1-continued

| Solvent | MP °C. | BP °C. | Dielectric Constant, E |
|---|---|---|---|
| 2,4-dimethyl sulfolane | −3 | 281 | |

The relatively high melting point of these solutions may necessitate heating the solution to about 45° C. to lower the viscosity. Viscosity may also be lowered by admixture with other non-aqueous solvents such as cyclic ethers, organic carbonates, organic lactones, organic nitriles, nitrohydrocarbons, etc.

The separator is rendered more hydrophilic and compatible with sulfolane by coating the surface with a film (21) of cationic polymer stable in the electrochemical environment of the cell, suitably a poly-alkenyl imidazoline, particularly 1-vinyl-2-imidazolines of the formula:

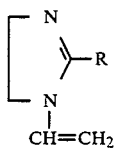

where R is H, alkyl of 1 to 5 carbon atoms, phenyl. These monomers are polymerized in aqueous medium by first quaternizing the amine function with dimethyl sulfate followed by homo- or co-polymerizing with a free radical catalyst such as a persulfate at 20°–55° C. The halide (Br⁻ or Cl⁻) salts are to be avoided since they would react with lithium. Examples of practice follow:

EXAMPLE 1

1-vinyl-2-methyl imidazoline was dissolved in aqueous medium and quaternized with an excess of dimethyl sulfate. The quaternized salt was reacted with potassium persulfate ($K_2S_2O_7$) to yield a polymer having the following repeating unit:

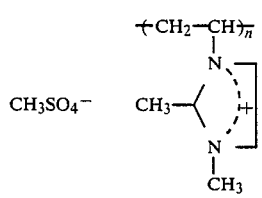

A sheet of Celgard was placed in the solution and the water evaporated. A film of polymer was deposited on the surface of the pores of the porous polypropylene material.

A cell was constructed containing a lithium electrode and a TiS₂-EPDM electrode as control and one modified with 3-Me sulfolane. The control cell contained a Celgard separator while the test cell contained the treated separator of Example 1.

Sulfolane and 3-methylsulfolane (3-MeS) were purified by stirring with lithium amalgam. The salt solutions (with LiAsF₆) were purified in a similar manner. Stripping and plating efficiencies were obtained using a PAR 173 Potentiostat/Galvanostat and a PAR 179 Digital Coulometer. The cell used to measure the conductivity utilized platinum electrodes and had a cell constant of 10.23 cm. The LiAsF₆/3-MeS electrolytes (1.3M) were cycles in a Li/TiS₂ cell. Cylindrical TiS₂ cathodes (about 500 mAhr) were fabricated using a 3-Me-S-modified EPDM binder as described.

The conductivity of sulfolane as a function of LiAsF₆ concentration (at 49° C.) is shown in FIG. 4. Also shown in FIG. 5 are the conductivities, as a function of temperature, of LiAsF₆ in sulfolane, 3-MeS, and a mixture of 3-MeS and 2-Me-THF. The maximum conductivity at 49° C. of LiAsF₆/sulfolane occurs at about 1.1M concentration and is similar to the room temperature value for 1.5M LiAsF₆/2-Me-THF (about $4\times10^{-3}\Omega^{-1}\text{-cm}^{-1}$). The low vapor pressure of the sulfolane system allows one to use higher temperatures to achieve the higher conductivities, shown in FIG. 5. This feature also reduces some packaging and sealing problems. The higher conductivity in the mixed solvent system reflects a lowering of the electrolyte viscosity by the 2-Me-THF component.

Stripping and plating efficiencies were measured using a platinum electrode. Approximately 10–100 milli-Coulombs/cm² of lithium were plated and stripped in the electrolyte, and the Coulombic efficiency determined. This is a more severe test of the solvent than would occur in an actual cell, but allows solvents to be rapidly tested in a reproducible manner. In 1.5M LiAsF₆/2-Me-THF electrolyte, efficiencies of 46±5 percent were obtained, indicative of the electrolyte reduction problem in this system. The reduction potential of LiAsF₆/2-Me-THF has not been determined because of competing electrochemical reactions. However, electrochemical and surface analytical studies indicate that 2-Me-THF is reduced at approximately the same potential as lithium, as suggested by the stripping/plating efficiencies. Sulfolane is harder to reduce than lithium. This increased reduction stability is seen in the improved stripping/plating efficiencies in sulfolane of 62±5 percent. An additional benefit of sulfolane is its high oxidation potential which is important during overcharge of the cell. Thus, sulfolane and 3-MeS should significantly improve the performance of secondary lithium cells.

The TiS₂ electrode and separator used with 2-Me-THF are not wetted sufficiently well by the polar sulfolane solvents. However, using the modified separator of the invention and TiS₂ electrode made with a modified binder of the invention provides a cell with the low internal resistance and the proper wetting needed for a useful cell.

Figure 6:
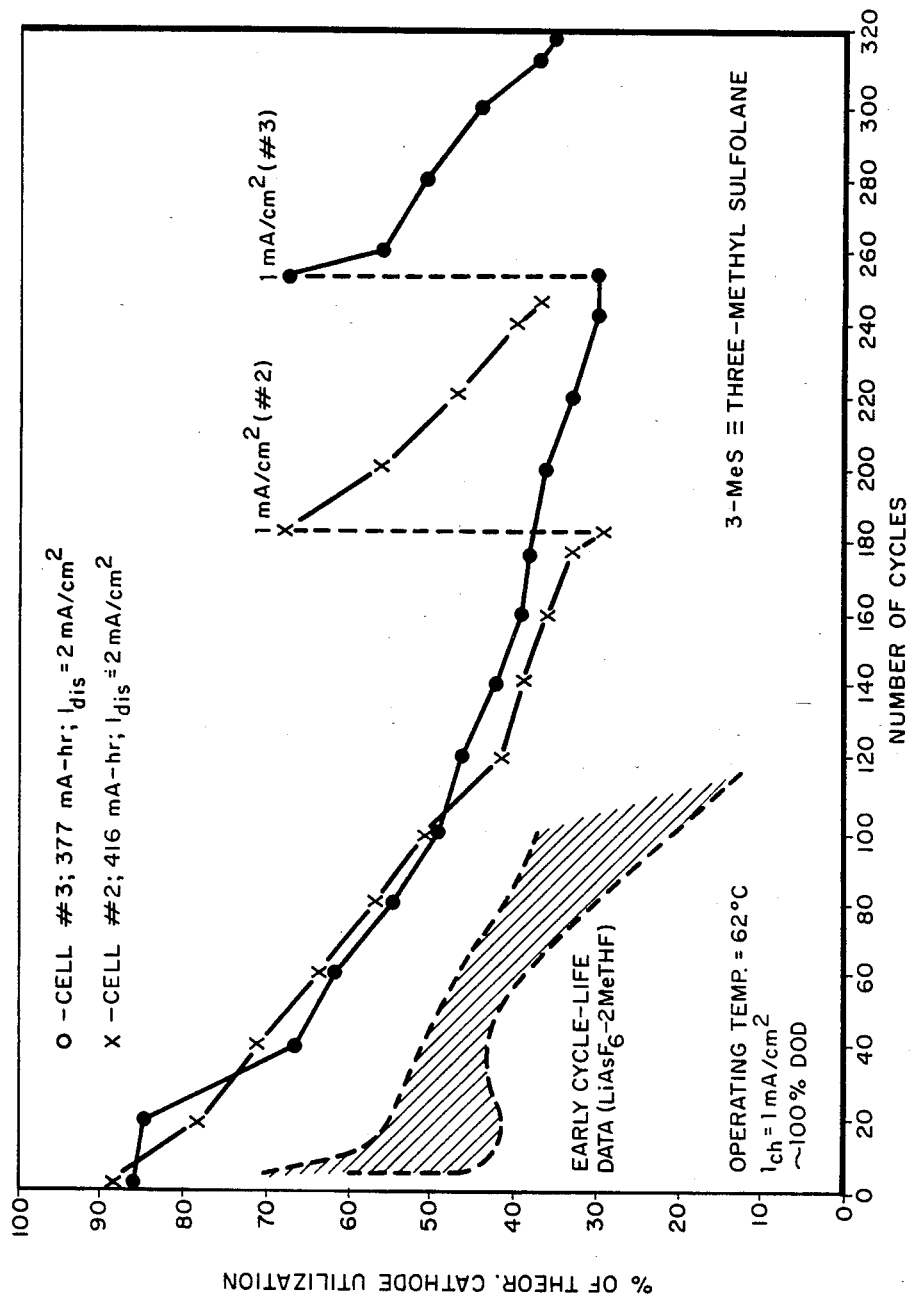
FIG. 6 is a graph showing cycle life of two Li/1.3M LiAsF$_6$/3-MeS/TiS$_2$ cells.

Employing the above modifications, it has been possible to cycle a 1.3M LiAsF₆/3-MeS Li-TiS₂ cell at 60° C. for over 352 cycles before the cell capacity drops to less than 30 percent of theoretical capacity. As can be seen in FIG. 6, the cathode capacity is declining with cycle-life, although the rate of decline decreases with cycling. The cause of this capacity decline is not known. After 352 cycles, the cells were opened for post-morten analysis by Scanning Electron Microscopy/Energy Dispersive Spectroscopy (SEM/EDS). These studies revealed that the TiS₂ cathode retained good mechanical integrity with primarily Ti and S present on the surface. The surface of the lithium electrode had become porous upon cycling and S, As and Si were observed. Si is one of the impurities in LiAsF₆ salt while the S and As are derived from cell reaction products. The sulfur may reflect solvent absorption or possible degradation. These same elements were also observed on the hydrophilic polypropylene separator. The presence of these polar molecules on the surface of the separator indicates good wetting and compatibility with the electrolyte.

It is to be realized that only preferred embodiments of the invention have been described and that numerous substitutions, modifications and alterations are permissible without departing from the spirit and scope of the invention as defined in the following claims.

We claim:

1. A separator for use in a battery comprising a sheet of hydrophobic, porous elastomer polymer material containing a surface film of a poly-alkenyl imidazoline containing a repeating unit of the formula:

$$CH_3SO_4^- \quad CH_3-\underset{\underset{CH_3}{|}}{\overset{\overset{+CH_2-CH\!\!\frac{}{}_{\overline{n}}}{|}}{\underset{N'}{\overset{N\diagdown}{\diagup}}}}\!\!\!\!\rangle^+$$

where R is slected from H, alkyl of 1 to 5 carbon atoms or phenyl.

2. A separator according to claim 1 in which the sheet is formed of a hydrocarbon polymer.

3. A separator according to claim 2 in which the polymer is polypropylene.

4. A separator as defined in claim 1 in which R is methyl.

5. A battery comprising in combination:
a first electrode comprising a dispersion of a chalcogenide in a hydrophobic, hydrocarbon elastomer binder absent unsaturation;
a second electrode including a Group Ia metal intercalatable with said chalcogenide;
a porous separator disposed between said electrodes comprising a hydrophobic elastomer substrate having a surface film of a poly-alkenyl imidazoline of the formula:

$$CH_3SO_4^- \quad CH_3-\underset{\underset{CH_3}{|}}{\overset{\overset{+CH_2-CH\!\!\frac{}{}_{\overline{n}}}{|}}{\underset{N'}{\overset{N\diagdown}{\diagup}}}}\!\!\!\!\rangle^+$$

where R is slected from H, alkyl of 1 to 5 carbon atoms or phenyl;
an electrolyte comprising a sulfolane solvent in which is dissolved in an ionizable metal salt; and
a casing receiving said electrodes and separator.

6. A battery according to claim 5 in which the electrodes and separators are in the form of a spiral-wound assembly.

7. A battery according to claim 5 in which the solvent comprises a compound of the formula:

$$R^2-\!\!\!\underset{\underset{O}{\diagup\!\!\diagdown}\underset{O}{\diagdown\!\!\!\diagup}}{\overset{}{\boxed{\phantom{xxxx}}}}\!\!\!-R^1$$

where $R^1$ and $R^2$ are individually selected from H, alkyl and 1 to 5 carbon atoms, alkoxy of 1 to 5 carbon atoms or aryl.

8. A battery according to claim 5 in which the solvent comprises sulfolane, 3-methyl sulfolane or 2,4-dimethyl sulfolane.

9. A battery according to claim 5 in which the metal is lithium.

10. A battery according to claim 5 in which the chalcogenide is selected from compounds of the formula:

$$M_{n'}X_m$$

where M' is a metal selected from the group consisting of titanium, zirconium, hafnium, niobium, tantalum, or vanadium; X is an element selected from oxygen, sulfur, selenium or tellurium, n is a number having a value from about 1.0 to 6.0 and m is a number having a value from 2 to 13.

11. A battery according to claim 10 in which the chalcogenide is titanium disulfide.

12. A battery according to claim 11 in which the elastomer binder contains a minor amount of sulfone functional groups.

13. A battery according to claim 12 in which the binder contains from 0.1 to 5% by weight of a sulfolane liquid.

14. A battery according to claim 13 in which the sulfolane is selected from sulfolane, 3-methyl sulfolane and 2,4-dimethyl sulfolane.

15. A battery according to claim 5 in which the elastomer is an ethylene-propylene copolymer.

* * * * *

UNITED STATES PATENT AND TRADEMARK OFFICE
CERTIFICATE OF CORRECTION

PATENT NO. : 4,550,064
DATED : October 29, 1985
INVENTOR(S) : Shiao-Ping S. Yen et al It is certified that error appears in the above-identified patent and that said Letters Patent are hereby corrected as shown below:

Column 7, Claim 1, after line 13, change formula to:

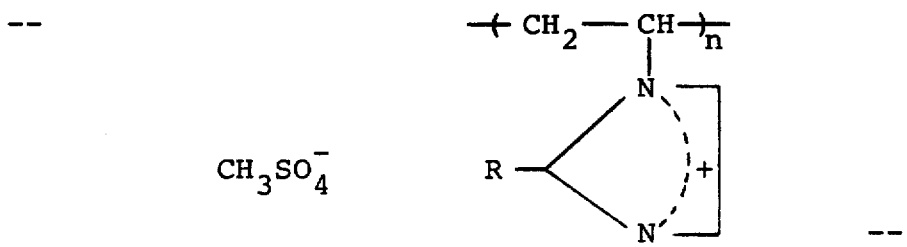

Column 7, Claim 1, line 23, correct "selected".
Column 7, Claim 5, after line 41, change formula to:

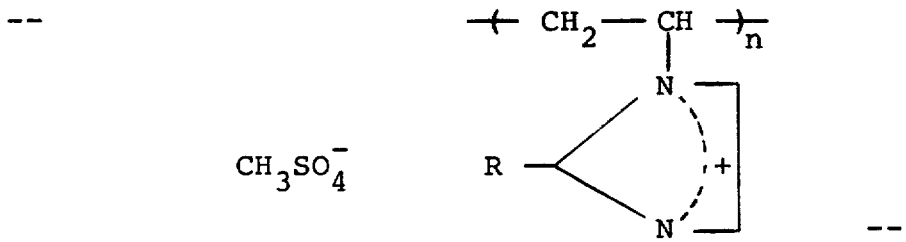

UNITED STATES PATENT AND TRADEMARK OFFICE
CERTIFICATE OF CORRECTION

PATENT NO. : 4,550,064

DATED : October 29, 1985

INVENTOR(S) : Shiao-Ping S. Yen et al

It is certified that error appears in the above-identified patent and that said Letters Patent is hereby corrected as shown below:

Column 8, Claim 5, line 1, correct "selected".

Signed and Sealed this

Twenty-first Day of October, 1986

[SEAL]

Attest:

DONALD J. QUIGG

*Attesting Officer*   *Commissioner of Patents and Trademarks*